Patented Sept. 9, 1941

2,255,073

UNITED STATES PATENT OFFICE 2,255,073

STERYL MAGNESIUM HALIDE AND PROCESS FOR PRODUCING THE SAME

Russell Earl Marker, State College, Pa., assignor to Parke, Davis & Company, Detroit, Mich., a corporation of Michigan No Drawing. Application March 4, 1938, Serial No. 194,013

9 Claims. (Cl. 260—397.2)

The invention relates to new steryl magnesium halides and a process for their preparation.

The present invention is a continuation in part of my application, Serial No. 74,223, filed April 13, 1936.

One of the objects is to obtain a new class of compounds which may be broadly designated as steryl magnesium halides. One of the features of my invention is the discovery that a sterol halide can be reacted with magnesium to convert it into its Grignard compound, that is, a compound of the type R—Mg—X where R represents the radical of a sterol hydrocarbon such as the cholesteryl radical, —$C_{27}H_{45}$, and X is a halogen atom.

My invention not only includes the preparation of cholesteryl magnesium halides but also includes reacting substituted as well as unsubstituted steryl halides. It is obvious, however, that in the present invention those substituted steryl halides are excluded wherein the substituent other than the halogen atom would react with magnesium, or the steryl magnesium halide being produced, or otherwise interfere with the desired production of a steryl magnesium halide derivative.

Hydroxyl, aldehyde, ketone, carboxylic and like groups which are reactive toward steryl magnesium halides are examples of substituents which are excluded, while alkyl, aryl, alicyclic and similar unreactive groups do not interfere when present as substituents in the steryl halide compounds to be reacted with magnesium. Furthermore, the carbocyclic rings of the sterol nucleus may or may not contain unsaturated carbon-to-carbon double bonds.

All of the new compounds have a sterol carbon skeleton of 17-carbon atoms attached to the group, —MgX. The sterol skeleton can be illustrated as follows:

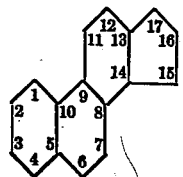

In general, the steryl halide compounds described above, which are suitable for reaction with magnesium to form the corresponding steryl magnesium halide, may be represented by the formula

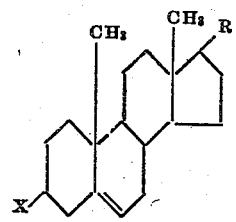

where X is a halogen atom replacing a hydrogen atom attached to one of the carbocyclic carbon atoms and R is a hydrocarbon side-chain. Other groups which are unreactive, such as those mentioned above, may also be present as substituents in these compounds, in addition to the halogen, X, and such compounds are included hereinafter and in the appended claims by the expression, "steryl halide." Thus it is obvious that the term "steryl" is intended to indicate a dimethyl cyclopentano polyhydrophenanthrene hydrocarbon radical having a side chain at the number 17 carbon atom.

The steryl magnesium halide compounds of the present invention are valuable intermediates in the chemistry of sterols and sterol derivatives and are often useful in the synthesis of compounds having characteristic physiological properties and therapeutic usefulness.

Steryl magnesium halide compounds are particularly useful intermediates, because they are capable of reacting with water or with the other compounds generally used for decomposing the so-called Grignard compounds to eliminate magnesium. The reaction products thereby obtained are often racemic mixtures in which a new chemical group has replaced the original halide atom of the steryl halide, the new group having a spatial arrangement which is the opposite of that originally present.

The steryl magnesium halide compounds may be isolated from the solutions in inert organic solvent in which they were produced as dry solid compositions. However, in such form they are not convenient to handle and, for practical purposes, the preferred compositions of the invention are those in which the steryl magnesium halide compound is present in an inert anhydrous organic solvent. In such form, the steryl magnesium halides are more conveniently brought into reaction with other substances, whether the other substances be anhydrous or not. The anhydrous organic solvent most often used is diethyl ether. However, other equivalent organic solvents, such as other ethers, hydrocarbons, anisole, benzol, phenetol, toluene, and the like, may be used.

The invention may be illustrated by the following examples:

EXAMPLE 1.—*Preparation of cholesteryl magnesium chloride*

10.2 grams of magnesium turnings are covered with 50 cc. of dry ether. One cc. of ethyl bromide is added to this mixture of ether and magnesium to assist in initiating the reaction between the magnesium and the cholesteryl chloride to be added later. After the reaction between the ethyl bromide and the magnesium has started, a solution of 170 grams of well-purified cholesteryl chloride in one liter of dry ether is added to the reaction mixture dropwise with vigorous stirring over a period of six hours. The ether solution is kept at reflux temperature during the addition of cholesteryl chloride. After the cholesteryl chloride is all added, the mixture is stirred vigorously for several hours. At the end of this time the magnesium is in solution, and the product consists of a substantially pure ethereal solution or suspension of cholesteryl magnesium chloride.

If sufficient solvent is present, either before or after the reaction of the magnesium, all of the cholesteryl magnesium chloride goes into solution. However, the presence in the solution of excess of undissolved cholesteryl magnesium halide does not interfere with the utility of such mixtures for further reaction.

The cholesteryl magnesium chloride can be used either in the form of the ether solution or suspension obtained, or the solvent can be evaporated, preferably in vacuo at low temperature, to leave a solid white residue of cholesteryl magnesium chloride. When making up the solid dry product for use, it can be taken up in ethyl ether or other suitable solvent.

The product of this example may be represented by the following formula:

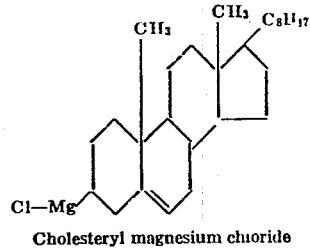

Cholesteryl magnesium chloride

EXAMPLE 2.—*Preparation of epi-cholesteryl magnesium chloride*

2 or 3 cc. of ethyl bromide are added to a mixture of 51 grams of magnesium turnings and 250 cc. of dry ether. After the reaction of the magnesium with the ethyl bromide has begun, a solution of 850 grams of pure epi-cholesteryl chloride dissolved in five liters of dry ether is added very slowly with vigorous stirring over a period of six hours. The epi-cholesteryl chloride used in this example can be obtained as described in J. Am. Chem. Soc. 58: 481–483, 1936, or by any other suitable known method. During the addition of the epi-cholesteryl chloride, the ether solution is kept at a reflux temperature. After all of the epi-cholesteryl chloride is added, vigorous stirring is continued for about 12 hours. At the end of this time, the magnesium has all been used up and a dry ethereal product containing substantially pure epi-cholesteryl magnesium chloride is obtained. The epi-cholesteryl magnesium chloride can be obtained in the form of an amorphous white or slightly gray-colored solid by removing the solvent.

The product of this example may be represented by the following formula:

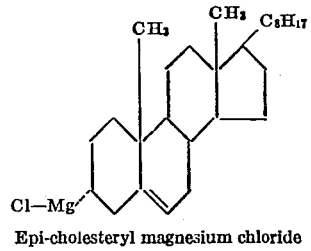

Epi-cholesteryl magnesium chloride

EXAMPLE 3.—*Preparation of sitosteryl magnesium chloride*

19.8 grams of carefully purified sitosteryl chloride, J. Am. Chem. Soc. 59: 2711, 1937, dissolved in 200 cc. of dry ether, are dropped onto two grams of magnesium metal with vigorous stirring. If the reaction of the magnesium with the sitosteryl chloride does not begin readily, it can be started by adding several drops of ethyl bromide. The sitosteryl chloride is added over a period of four hours, after which the mixture is stirred and refluxed overnight or somewhat longer if necessary. Any unchanged magnesium can then be filtered off in an inert atmosphere. Before filtering, however, it is preferable to add enough dry ether to put any undissolved sitosteryl magnesium chloride into solution. The product obtained is an anhydrous ether solution of sitosteryl magnesium chloride. The ether can be removed as in the preceding examples and solid amorphous white sitosteryl magnesium chloride is obtained. The solid product can be dissolved up again in ether or in various inert anhydrous organic solvents for convenience in handling, portioning out, and reaction, if desired.

The product of this example may be represented by the following formula:

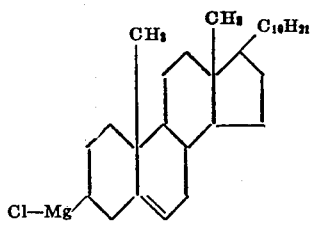

Sitosteryl magnesium chloride

EXAMPLE 4.—*Preparation of stigmasteryl magnesium chloride*

22 grams of pure stigmasteryl chloride in 200 cc. of dry ether are added over a period of four hours to a well-stirred mixture of two grams of magnesium, 10 drops of ethyl bromide and 10 cc. of dry ether. The mixture is stirred and refluxed for 20 hours. The reaction mixture is treated for separation of unchanged magnesium as given above for example 3 and a solution of stigmasteryl magnesium chloride in ether is thereby obtained. By removing the ether, solid amorphous grayish white stigmasteryl magnesium chloride is produced.

The product of this example may be represented by the following formula:

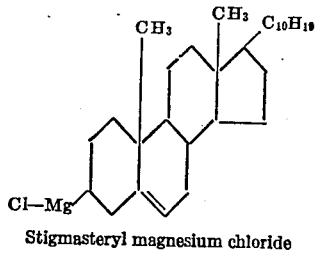

Stigmasteryl magnesium chloride

In carrying out the examples given, the steryl bromides or iodides can be used, as well as the chlorides, for reaction with magnesium metal. Instead of using ethyl bromide to initiate reaction with magnesium, any other suitable compound may be used, such as methyl iodide, ethyl iodide, ethyl chloride, iodine, various lower alkyl halides, etc.

The steryl magnesium halide compounds are prone to oxidation and are quickly decomposed in presence of moisture, ammonia, carbon dioxide, and other reactive substances. They can be produced by reacting magnesium, as illustrated in the examples, with the halides produced by replacing the hydroxyl of sterols with halogen. For example, phosphorous halides, thionyl halides and like halogenating agents can be reacted with dihydrocholesterol, coprosterol, ostreasterol, ergosterol, cinchol, fucosterol, zymosterol, 4-cholestanol, 7-hydroxy cholestane, ergostanol, 7-dehydrocholesterol, neoergosterol, and various other substituted and unsubstituted hydroxysterol compounds, to give the corresponding derivative in which the hydroxyl is replaced by halogen. These steryl halide compounds are then reacted with magnesium to give steryl magnesium halide compounds.

Numerous hydrocarbon halides, especially those of higher molecular weight, are known to be so unreactive toward magnesium that for practical purposes the yields of organo-magnesium halide are negligible. The steryl halides were found to be of this type.

What I claim as my invention is:
1. A steryl magnesium halide.
2. A steryl magnesium chloride.
3. Cholesteryl magnesium halide.
4. Sitosteryl magnesium halide.
5. Stigmasteryl magnesium halide.
6. Cholesteryl magnesium chloride.
7. A product having the formula

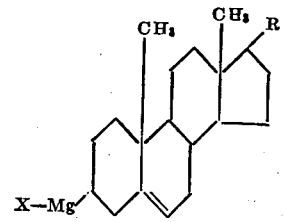

where X is halogen and R is a hydrocarbon sidechain.

8. Process for the preparation of a steryl magnesium halide which comprises reacting magnesium with a steryl halide in the presence of an anhydrous inert organic solvent and a lower alkyl halide.

9. Process for the preparation of a steryl magnesium halide which comprises reacting magnesium with a steryl halide in the presence of an anhydrous inert organic solvent and a lower alkyl halide while removing reaction products from the surface of the magnesium to facilitate its reaction with the steryl halide.

RUSSELL EARL MARKER.